United States Patent [19]

Strathman et al.

[11] 4,023,027

[45] May 10, 1977

[54] CIRCLE/GRAPHICS CRT DEFLECTION GENERATION USING DIGITAL TECHNIQUES

[75] Inventors: Lyle R. Strathman, Cedar Rapids; Robert A. Bolin, Marion; Vincent B. Collins; Ronald L. Swanson, both of Cedar Rapids, all of Iowa

[73] Assignee: Rockwell International Corporation, El Segundo, Calif.

[22] Filed: Nov. 10, 1975

[21] Appl. No.: 630,389

[52] U.S. Cl. ............................ 235/152; 340/324 A

[51] Int. Cl.² ............................................ G06F 3/14

[58] Field of Search ........................... 235/152, 197; 340/324 R, 324 A

[56] References Cited

UNITED STATES PATENTS

| | | | |
|---|---|---|---|
| 3,493,732 | 2/1970 | Zeheb | 235/152 X |
| 3,510,865 | 5/1970 | Callahan et al. | 340/324 |
| 3,763,363 | 10/1973 | Saita et al. | 235/152 |
| 3,794,993 | 2/1974 | Christopher | 343/5 DP |
| 3,898,448 | 8/1975 | Clark | 235/152 |
| 3,938,130 | 2/1976 | Burnham et al. | 340/324 A |

*Primary Examiner*—David H. Malzahn
*Attorney, Agent, or Firm*—Richard W. Anderson; Robert J. Crawford

[57] ABSTRACT

A system for generating respective X and Y beam deflection command signals as respective running binary counts in X and Y deflection counters utilizing digital computations based on the straight line expressions Y=X tan $\alpha$, where $\alpha$ is the line slope. Relative clock rates are defined by the tan $\alpha$ relationship therebetween, and, by defining a line as lying in one of eight 45° octants, and a circle as successive points of tangency of a plurality of lines tangent to the circle comprising circumferential segments in eight contiguous ones of the octants, the system effects generation of respective X and Y counts to trace a line of selected length and slope as well as a circle of selected radius utilizing but a single table of tangents for angles between 0° and 45° as the required data storage.

6 Claims, 9 Drawing Figures

| OCTANT | α | X-CLOCK | Y-CLOCK |
|---|---|---|---|
| I | 0°→45° | + BASE CLOCK | − BASE CLOCK TAN α |
| II | 45°→0° | + BASE CLOCK TAN α | − BASE CLOCK |
| III | 0°→45° | − BASE CLOCK TAN α | − BASE CLOCK |
| IV | 45°→0° | − BASE CLOCK | − BASE CLOCK TAN α |
| V | 0°→45° | − BASE CLOCK | + BASE CLOCK TAN α |
| VI | 45°→0° | − BASE CLOCK TAN α | + BASE CLOCK |
| VII | 0°→45° | + BASE CLOCK TAN α | + BASE CLOCK |
| VIII | 45°→0° | + BASE CLOCK | + BASE CLOCK TAN α |

CIRCLE/GRAPHICS CRT DEFLECTION GENERATION USING DIGITAL TECHNIQUES

This invention relates generally to the technique of displaying graphics on a cathode ray tube screen using digital techniques whereby moving deflection code words are developed in respective X and Y deflection counters the analog voltage values of which are utilized as respective X and Y deflection signals for the cathode ray tube electronic beam. More particularly, the present invention relates to a digital System for displaying graphics in the form of lines and circles by a unique system for addressing a memory into which tangents of a successive number of angles between 0° and 45° are stored, thereby permitting a high degree of graphic display versatility while minimizing data storage requirements.

Known system for generating moving digital codes indicative of cathode ray tube X and Y deflection requirements operate on the basis of stroke writing, where the imagery to be displayed is systematically defined as a sequence of strokes which, when taken in sequence, trace out a selected character or imagery on a cathode ray tube screen. These systems are controlled by readout of sequential stroke commands from a storage source.

For example, a known digital alphanumeric stroke writing technique such as described in U.S. Pat. No. 3,775,760 to Lyle R. Strathman operates to generate running digital deflection codes indicative of X and Y beam deflections to trace out a plurality of contiguous strokes so as to display alphanumeric characters. Each alphanumeric character to be displayed imposes a storage requirement of a predetermined sequence of stroke words which collectively causes the beam to trace out the selected character. In other words, the versatility or capability of the system is limited by the extent to which stored words may be sequentially addressed in predetermined permutations to obtain the desired result. These types of systems, then, might be considered as "hard-wired" systems, in that the display capability of the machine is completely defined by the predetermined storage and addressing sequences which are built into the design.

The present invention, in contradistinction to systems whose capability is determined entirely by the amount of stored command words and the manner in which these words may be addressed to develop specific, desired deflection codes, reduces the storage requirement to a relatively simple tangent table of angles between 0° and 45°. The number of incremented is defined by the number of binary bits employed in the design. Addressing is simplified to that of addressing predetermined ones of the tangent values in the tangent storage read only memory (ROM). The X and Y digital counters may be initialized to start a line at any desired point or a circle at any desired point on the screen, with the slope of the selected line or the diameter of the selected circle being uniquely defined by the manner in which the tangent ROM is addressed rather than by, for example, readout of discrete storage of successive counter incrementing command sequences for each selected diameter circle or sloped line to be written.

Accordingly, the primary object of the present invention is the provision of a digital system for displaying line and circle graphics on a cathode ray tube, wherein lines of predetermined slope and circles of selected diameter may be drawn by a digital system employing a unique addressing technique for a tangent storage table of successively incremented angles from 0° to 45°.

A further object of the present invention is the provision of a cathode ray tube line/circle graphics display system requiring vastly simplified storage addressing requirement over systems employing known techniques.

A further object of the present invention is the provision of a cathode ray graphics display system by means of which lines and circles of respective predetermined slope and diameter wherein the line slope and circle diameter selection is attained by relatively simple addressing of a memory comprised of a tangent table rather than by discrete addressing of predetermined storage words related to each selected line slope and circle diameter, thus vastly reducing the hardware requirement for such a system without impairing the versatility thereof.

The present invention is featured in the generation of moving digital code words in respective X and Y counters, with the count analog·defining respective X and Y cathode ray tube beam deflection signals, in a system which automatically adjusts the relative X and Y clock rates in accordance with an addressed tangent related to the desired line slope of a line to be drawn and which automatically increments X and Y deflection counters in accordance with respective clock inputs, the rates of which are determined by addressed tangent values corresponding to the slopes of sequential points of tangency of a sequence of lines tangent to a circle of a selected diameter. The system to be described reduces line and circle graphics display digital code generation to the consideration of adjustment of respective X and Y counterclock input rates in accordance with the mathematical expression for a straight line, or series of straight lines, thus reducing the storage requirement to slope values (tangent values) as defined by line equations.

These and other features and objects of the present invention will become apparent upon reading the following description with reference to the accompanying drawing in which:

FIG. 1 diagrammatically represents line drawing concepts as employed in the invention;

LINE DRAWING THEORY

A straight line may be mathematically defined as:

$$Y = X \tan \alpha. \quad (1)$$

Figure 1A:
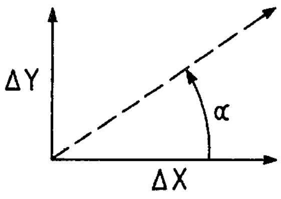

Expression (1) defines a line passing through a zero axis and having a slope equal to tangent $\alpha$. If, then, it is wished to generate cathode ray tube X and Y deflection voltages such that the beam is displaced to define a straight line of a particular slope, from FIG. 1A, we see that the rate of change of Y is equal to the rate of change of X multiplied by the line slope (the tangent of the angle $\alpha$). If, then, we let $\Delta X$ equal a base clock rate in a digital system, then $\Delta Y$, as concerns the dashed line desired to be drawn as depicted in FIG. 1A, is less than the base clock rate. $\Delta Y$ is, in fact, equal to the base clock rate multiplied by the tangent of the slope angle $\alpha$. The rate of change of the Y deflection may therefore be expressed in terms of the rate of change of the X deflection as follows:

$$\Delta Y = \Delta X \tan \alpha; \text{ where } \Delta X \text{ and } \Delta Y \text{ are small.} \quad (2)$$

Expression (2) may be expanded as a series, as follows:

$$\Delta Y_1 + +\Delta Y_N = \Delta X_1 \tan \alpha_1 +. +\Delta X_n \tan \alpha_N \quad (3)$$

The following relationship therefore, holds true:

$$Y = \sum_{N=1}^{N} (\Delta Y)_N = \Delta X \sum_{n=1}^{N} (\tan \alpha)_n, \text{ where } \Delta X \text{ is constant.} \quad (4)$$

Expession 4 may be reexpressed as follows, when the tangent $\alpha$ term is constant, as it would be for a straight line;

$$Y = \tan \alpha \sum_{n=1}^{N} (\Delta X)_N, \text{ where } \tan \alpha \text{ is constant.} \quad (5)$$

Accordingly, when the rate of change of X, ($\Delta X$) and the tangent $\alpha$ term are both constant and $$\sum_{n=1}^{N} (\Delta X)_n = X,$$

the following expression holds true;

$$Y = X \tan \alpha \quad (6)$$

Figure 1B:
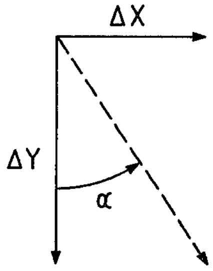

The above considerations may be extended to a negative slope line as depicted in FIG. 1B, wherein the rate of change of X is less than the rate of change of Y, and assuming conventional algebraic sign for deflection terminology, that is $\Delta X$ is plus for deflection to the right and minus for deflection to the left while $\Delta Y$ is plus for deflection upwardly and minus for deflection downwardly, the line depicted in FIG. 1B may be expressed as $X = -Y \tan \alpha$, where Y is the base clock applied to increment Y deflection downardly and X is less than this base clock rate by the relationship $X = -Y \tan \alpha$, with the X deflection being positive (deflection to the right). In accordance with the present invention, the above mathematical considerations will be seen to be implemented by a relatively simple system incorporating a single octant tangent storage system (0° to 45°).

CIRCLE DRAWING THEORY

In accordance with the present invention, a circle may be drawn by connecting successive points of tangency of a plurality of lines tangent to the circumference of the circle, where the line tangent to the circumference of the circle is expressed as:

$$Y = X \tan \alpha \quad (7)$$

Figure 2:
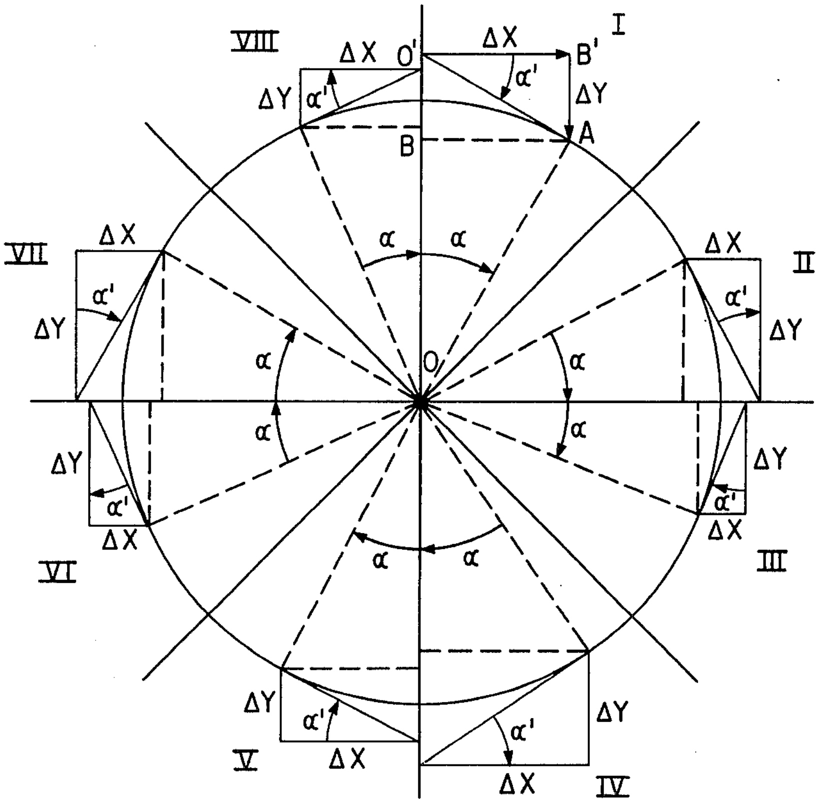
FIG. 2 is a diagrammatic representation of circle drawing theory as employed in the present invention.

Referring to FIG. 2, and specifically to the 45° sector of that circle identified as octant I, we see two similar triangles OAB and O'AB', where the angle $\alpha$, defined by AOB, is equal to the angle $\alpha'$, defined by AO'B', and the line O'A tangent to the circumference of the circle at point A is defined as:

$$\Delta Y = -X \tan \alpha, \text{ where } \tan \alpha \text{ varies as } X. \quad (8)$$

Since the angles $\alpha$ and $\alpha'$ are equal, the following expression holds:

$$\tan \alpha' = f(X) = \tan \alpha \quad (9)$$

The function of X in expression (9) is related by the rate of curvature of the circle to be drawn.

If we let $\Delta X$ be the constant base clock rate, then in tracing a circle, successive changes in $\alpha Y$ are related to successive changes of $\Delta X$ as follows:

$$\begin{aligned} \Delta Y_1 &= -\Delta X_1 \tan \alpha_1 \\ +\Delta Y_2 &= -\Delta X_2 \tan \alpha_2 \\ +\Delta Y_N &= -\Delta X_N \tan \alpha_N. \end{aligned} \quad (10)$$

Expression (10) can then be rewritten as:

$$\Delta Y_1 + \ldots + \Delta Y_N = \Delta X_1 \tan \alpha_1 + \ldots + \Delta_{XN} \tan \alpha_N \quad (11)$$

Since $\Delta X$ was established to be a constrast, the following expression holds true:

$$\Delta X = \Delta X_1 = \ldots = \Delta X_N, \quad (12)$$

and expression (11) can be rewritten as follows:

$$\Delta Y_1 + \ldots + \Delta Y_N = \Delta X[\tan \alpha_1 + \ldots + \tan \alpha_N] \quad (13)$$

Accordingly, the following relationship is established:

$$Y = \sum_{n=1}^{N} (\Delta Y)_N = \Delta X \sum_{n=1}^{N} (\tan \alpha)_N, \text{ where } \Delta X \text{ is constant.} \quad (14)$$

FIG. 2 illustrates contiguous octants of the complete circle, identified as octants I–VIII. It may be generally seen that if one wished to draw the sector of the circle as defined by octant I, the X counter would have to be incremented in a positive sense to cause the beam to deflect to the right, while simultaneously the Y counter would have to be incremented by a lesser number of clocks in a downward direction to cause the beam to be deflected downwardly. In octant I, $\Delta X$ defines the major axis projectin of the tangent line 0'A and a $\Delta Y$ defines the minor axis projection. The change in Y is related to the change in X by the relationship $\tan \alpha = \lambda \Delta Y/\Delta X$. If the angle $\alpha$ is considered to vary from 0° to 45° in octant I then the X clock becomes the base clock applied in a positive incrementing sense to the X counter, and the Y clock becomes the product of the base clock and tangent $\alpha$, applied in a negative sense to the Y counter. FIG. 2 illustrates further geometrical considerations for successive octants II through VIII. As will be further described, the angle $\alpha$ in octant II will be defined as varying from 45° down to 0°. In octant III, the angle $\alpha$ varies from 0° to 45°; in octant IV from 45° to 0°; in octant V from 0° to 45°; and in octant VI from 45° to 0°It is seen that the angle $\alpha$, as concerns successive ones of the octants I–VIII and considering the composite beam deflection to trace the circle, varies alternately between 0° and 45° and 45° and 0° in successive ones of the octants. The significance of the assumed variation in the angle $\alpha$ will become apparent as concerns the particular implementation of the invention to be further described which uniquely permits use of a table of tangents for but one octant (45°) of the circle circumference to accomplish the end result of tracing out the entire circle.

In the second octant depicted in FIG. 2, the angle $\alpha$ varies from 45° to 0° as the beam traces the circle in octant II, the rate of change of Y exceeds that of the rate of change of X, and the relationship between the rates of change is defined by the tangent of the angle $\alpha$. If then, a base clock is applied to the Y deflection counter and the product of the base clock and the tangent of $\alpha$ be applied to the X counter, the beam will appropriately trace out the second octant of the circle; here again, the X change being in a positive sense and the Y change in a negative sense. Further analysis of FIG. 2 depicts the geometry for octants III through VIII each defining one of the X and Y clocks as being the base clock, with the other clock being related thereto, and being less than the base rate, as a function of the angle $\alpha$. FIG. 2 illustrates for each of the octants I–VIII the manner in which the angle $\alpha$ is assumed to vary within that octant, and identifies the X and Y clocks to accomplish a drawing of the circular segment associated with that octant. Whether the base system clock is routed to the X and Y counter is defined by the geometry associated with the octants. The plus and minus signs in the tabulation of FIG. 2 indicate that the respective X or Y clock is to be clocked upwardly or downwardly from the existing count.

CIRCLE/LINE DRAWING-RELATED THEORY

The circle drawing theory then suggests that an implementation must include a base clock, some means of developing the product of that base clock and the tangent of the angle $\alpha$, and further, some means of determining in which octant the operation is functioning to effect the proper routing of the major clock (base clock) and the minor clock (base clock — tangent $\alpha$ product) to the X and Y counters which develop the binary counts definitive of X and Y deflection, respectively.

A further analysis of the geometry of FIG. 2 suggests that line drawing in any one of the octants I–VIII may be accomplished by a determination of the major axis projection of the line within the octant for the purpose of assigning the base clock input to the X or Y counter associated with that major axis. For example, referring to octant I depicted in FIG. 2, if it were desired to draw the line OA, the slope of which is defined by the depicted angle $\alpha$, the major axis projection OB of the line OA is the greater of the axis projections, and thus to draw a line in octant I, the geometry suggests that the major clock be routed to the Y counter and the lesser clock rate (the product of base clock and tangent $\alpha$) be routed to the X counter. Further, by using conventional sign terminology, the major axis would be utilized to clock the Y counter upwardly (+) while the minor axis clock would be used to clock the X counter upwardly (+) to dictate an increasing deflection to the right.

further analysis of FIG. 2 concerning the drawing of lines in the remaining octants II-VIII indicates that for each of these octants, there is a major and minor axis projection of the line which dictates to which clock the base clock is applied, to which clock the lesser clock, (base clock — tangent $\alpha$ product) is applied, and whether the counters is to be clocked upwardly or downwardly to accomplish the proper deflection voltage combination to draw the line. Reference is made to Table 1 below which lists a correlation between the assigned clock and the direction of X and Y counter implementing and decrementing for each of the eight octants:

TABLE 1

| 3-Bit Code | Circle Mode Octant | Line Mode Octant | Major Axis Clock | Minor Axis Clock |
|---|---|---|---|---|
| 000 | I | III | Up-X | Down-Y |
| 001 | II | IV | Down-Y | Up-X |
| 010 | III | V | Down-Y | Down-X |
| 011 | IV | VI | Down-X | Down-Y |
| 100 | V | VII | Down-X | Up-Y |
| 101 | VI | VIII | Up-Y | Down-X |
| 110 | VII | I | Up-Y | Up-X |
| 111 | VIII | II | Up-X | Up-Y |

When drawing a circle, the octants I–VIII dictate major axis and minor axis clocks in directions as dictated by the tabulation in FIG. 2. It is noted that the drawing of a line somewhere in each of octants I–VIII dictates major axis and minor axis clock routings which are distinctly different from the clock routings for the circle drawing mode but, nonetheless, include each of the major axis and minor axis clock permutations. As will be further described, and, as is suggested in Table 1, a system to implement the above described theoretical considerations needs to be "told" in which of the eight octants the operation is taking place at any one time. Further discussion will bear out that in the case of circle mode drawing, a simple three-bit counter can successively supply the information as to which octant the circle mode is operating at any one time. In the case of line drawing, that same code might be preassigned to identify in which octant a desired line is to be drawn, and a "sign" code inputted into the system to effect the proper major axis and minor axis clock routing to accomplish the line drawing. A three-bit code is sufficient to define the routing combinations of the major and minor axis clocks, since a decoding system which receives the major and minor axis clock pulse trains need only known whether X or Y in the major clock, whether X is plus or minus, and whether Y is plus or minus.

IMPLEMENTATION-LINE AND CIRCLE DRAWING MODES

Figure 3:
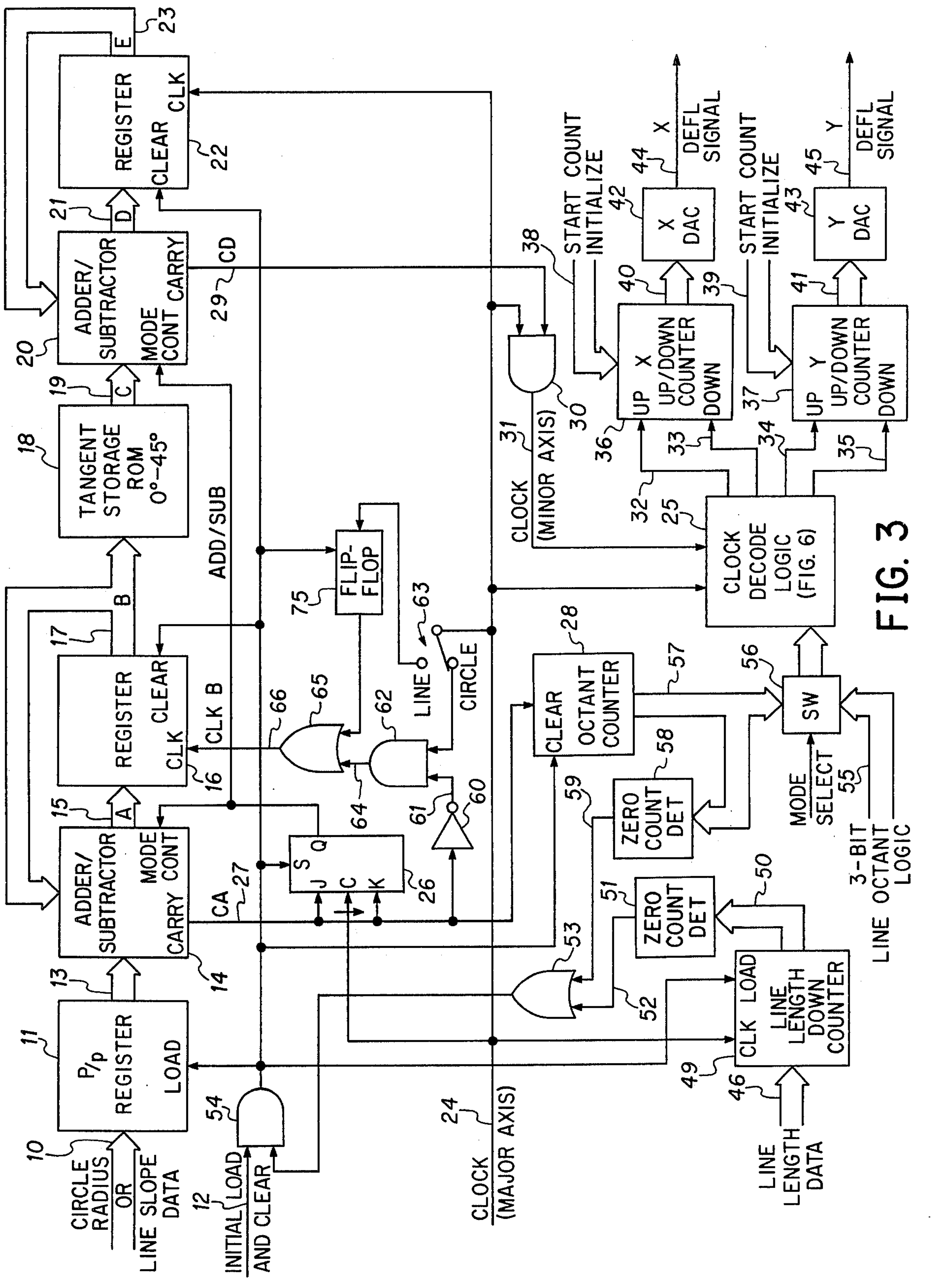
FIG. 3 is a functional block diagram of a line and circle graphic drawing system in accordance with the present invention.

FIG. 3 is a functional block diagram of a system implementing the above-discussed line and circle graphics operational modes. The uppermost portion of FIG. 3 comprises digital calculating circuitry by means of which the minor axis clock is developed as the product of the major axis clock and the tangent of $\alpha$. Referring to FIG. 3, circle radius or line slope data 10 is inputted from peripheral input equipment to a register 11 and loaded into the register 11 such that the input appears at the register output 13 upon an initial load and clear pulse being inputted on line 12. The binary number loaded into register 11 is applied as input to a first adder/subtracter 14.

The output 15 from binary adder/subtractor 14 is applied to a further register 16, the output 17 of which is applied as an addressing input to a tangent storage read-only memory 18 and, in addition, as a second input to binary adder/ subtractor 14. Tangent storage ROM 18 contains therein a predetermined number of tangent values of incremented angles between 0′ and 45°. The addressed tangent value at any one time appears on the output 19 from ROM 18 and is applied as input to a further adder/subtracter 20. The output 21 from adder/subtracter 20 is applied to an output register 22 and output 23 of which is applied back as a second input to adder/subtractor 20. The initial load and clear line 12 is applied to the load input of the input register 11, and to the clear inputs of the registers 16 and 22 respectively associated with the two adder-subtracters.

The computational system operates on a preselected bit capacity such as, for the implementation, 8 bits. Therefore, registers 11, 16, and 22 contain a maximum binary value of 255. Resolution as related to an ideal circle can be improved by increasing the number of bits in the computational circuitry. In addition, registers 11 and 16 and adder/subtracter 14 contain fractional binary data. The number of fractional bits is related to the circle diameter resolution. The tangent ROM contains successive values of tan $\alpha$ where $\alpha$ is defined (for Octant I) as the angle between the vertical radii and the radii through the point on the circle which has an X coordinate equal to N(Δ X).

A major axis clock line 24 is applied directly to clock decode logic block 25, and to the clock input of the output register 22, as well as selectively to the clock input of register 16. The major axis clock input 24 is additionally applied directly as a clock input to J-K flip-flop 26 the Q output of which is applied as add/subtract mode control logic input to each of the adder/subtracters 14 and 20. The carry output 27 of the first adder/subtracter 14 is applied as a logic input to the add/subtract logic developing flip-flop 26, to further logic circuitry which selectively applies the major axis clock 24 to the clock input of register 16, and to an octant counter 28. The major axis clock input 24 and the carry output 29 of adder/subtracter 20 are applied to AND gate 30 the output 31 of which comprises the minor axis clock input to the clock decode logic circuitry 25. The clock decode logic block 25 produces four outputs 32, 33, 34, and 35. Outputs 32 and 33 comprise respective up and down clock inputs to the X up/down counter 36, while clock decode logic outputs 34 and 35 comprise respective up and down clock inputs to the Y up/down counter 37. As will be further described, the outputs 32-35 from clock decode logic 25 comprise predetermined permutations or respective major and minor clock pulse trains 24 and 31 to effect the circle and line graphics drawing.

The X and Y up/down counters 36 and 37 receive circle/line start point initializing inputs 38 and 39 and develop respective outputs 40 and 41 for application to respective digital/analog converters 42 and 43, the respective outputs 44 and 45 of which comprise respective analog X and Y deflection signals for a cathode ray tube upon which the graphics are to be displayed.

The implementation of FIG. 3 is selectively adaptable for either circle or line drawing modes of operation. For the purpose of line drawing, a line-length is inputted from peripheral data along with the aforedescribed three-bit logic input definitive of the octant within which the line lies. For this purpose, line length input data in the form of a binary count, is inputted on line 46 to the load input of a down-counter 49 to which the major axis clock input 24 is applied as a clocking input. The output 50 from the down counter 49 is applied to a zero-count detector 51 with the output 52 therefrom being applied through an OR gate 53 as a first input to an AND gate 54 through which the initial load and clear pulse on line 12 is applied to various parts of the system. In addition to the line-length input data 46, the three-bit line octant logic is inputted to the system on line 55 and selectively applied through mode select switch 56 as a three-bit logic input to the clock decode logic block 25. Alternatively, in circle drawing mode, the output of octant counter 28 supplies an input 57 through mode switch 56 to supply the three-bit input code to the clock decode logic block 25. The output 57 from the octant counter 28 is additionally applied through a zero-count detector 58 the output 59 of which is O′d with the output of the line-counter zero count detecter 51 in OR gate 53. As will be further described, the zero count-detectors 51 and 58 develop a respective discrete logic level when the line of selected length has been drawn, or, alternatively, the circle of selected diameter has been drawn, the ultimate effect of which is to load down the initial load and clear line 12 to stop the operation of the system and ready it for a subsequent drawing command input.

CIRCLE DRAWING MODE-GENERAL OPERATION

To draw a circle, register 11 of FIG. 3 is initialized with a binary number on input line 10 corresponding to the radius of the circle to be drawn. The larger the binary inputted to register 11, the smaller the diameter of the circle.

Therefore, the radius of curvature may be stated to be an inverse function of the radius of the circle to be drawn or:

$$\text{Radius of Curvature} = f\left(\frac{1}{\text{Radius}}\right) \qquad (15)$$

An initial load and clear pulse on line 12 loads the radius of curvature related input number from line 10 into the register 11. Simultaneously an octant start point count is initialized into the X and Y up/down counters in the form of respective binary counts 38 and 37 which define the starting point for the circle drawing by initializing corresponding counts in the X and Y counters to develop X and Y deflection signals defining the start point.

Adder/subtracter 14, into which the rate of curvature number from register 11 is inputted, is enabled in the add mode to suply this same number on output line 15 to register 16 where it is clocked onto register output line 17 by the major axis clock input 24. The selected input number on line 10 is sequentially added to the total in adder/subtracter 14, with the accumulative total of these summations being applied on register output line 17 to tangent storge ROM 18, such that tangent ROM 18 is sequentially addressed at a major axis clock rate to output successive tangent values on line 19 to adder/subtracter 20. Thus successive tangent values, relating to the rate of curvature of the desired circle to be drawn, are inputted to adder/subtracter 20, and the addition is clocked by the major axis clock 24. Since the output 21 from adder/subtracter 20 is loaded into register 22 at the major axis clock rate, with the output 23 of register 22 being applied back to be added to the accumulated total in adder/subtracter 20, after N clock pulses, the number appearing in adder/subtracter 20 may be expressed as:

$$\text{No. in adder/subtracter } 20 = \Delta X[\tan \alpha_1 + \ldots + \tan \alpha_N] \quad (16)$$

Since expression (16) is equal to the above expression (13), one may write:

$$Y = \text{No. in adder/subtracter } 20, \text{ where } \Delta X \text{ is constant.} \quad (17)$$

It follows that using the overflow from the clocked adder/subtracter 20 (which overflows when the number therein is equal to or greater than unity) to gate major axis clock pulses as though AND gate 30, the output 31 from AND gate 30 becomes the minor axis clock for subesequent counter incrementing or decrementing, and the X/Y position counters will trace out the beam movement which corresponds to the circumference defined by the circle radius input data inputted on line 10.

The general concept of circle drawing is to successively input a selected number of major axis clock rate sequentially addressed tangent values of angles between 0° and 45°, each angle being defined (for Octant I) as the angle between the vertical radii and the radii through the point on the circle which has an X coordinate equal to N(Δ X) where N is the number of clocks chosen to be the major axis clock input in any octant. This determines the radius of the circle to be drawn. The number N is defined as an integer up to the maximum defined by the system; that is, an eight-bit system allows a maximum of $2^8$=256. If N=256, the tangent register has successive tangent values of angles between 0° and 45°, and the major axis projection in any octant is 256 clocks in length, defining the maximum diameter circle which can be drawn by eight-bit hardware. In effect, the beam is caused to trace out the points of tangency of a succession of lines tangent to the circle. The following operational description of the manner in which the circuitry of FIG. 3 may draw a circle of predetermined radius of curvature will aid in defining the circle drawing operation.

CIRCLE DRAWING MODE-OPERATIONAL EXAMPLE

Circle mode is instituted by first pulsing the initial load and clear line 12 of FIG. 3, which clears the storage registers 16 and 22. This pulse additionally resets the various logic control flip-flops and counters in the system. Additionally the load and clear pulse 12 loads the circle size related data on input line 10 into register 11 which is designated a P/p register. The contents of the P/p register 11 are not changed during the generation of any given circle.

As previously stated, the larger circle which can be drawn is limited by the number of bits that are implemented into the system hardware. In an example to be here described, the number of bits is assumed to be eight, thus defining P=256 (i.e., the largest number the P/p register 11 can hold is a binary (256-1), or 255). Also, the largest circle which can be drawn with eight-bit hardware is that circle which has 256 major axis clock pulses in one of its octants.

Figure 4:
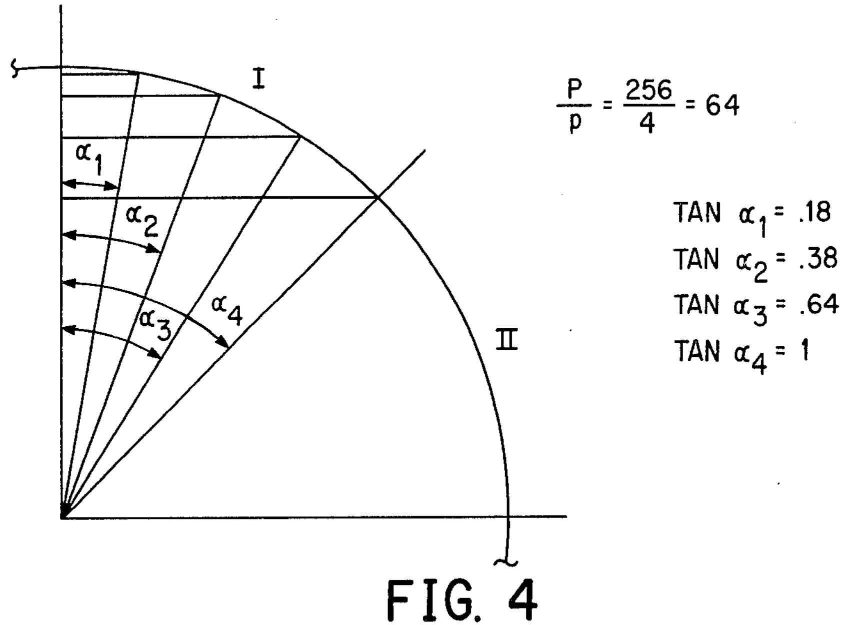
FIG. 4 is a diagrammatic representation of an exampled circle drawing sequence.

As an example and with reference to FIG. 4, let it be assumed that the desired circle is that circle which has four major axis clock pulses in one octant. One quadrant of the circle is depicted in FIG. 4. In this case the number loaded into the P/p register is defined as P/p=256/4=64. After the binary number 64 is loaded into the P/p register 11, the major axis clock 24 is started. Adder/subtracter 14 successively adds/subtracts 64 to a running total which was started at zero and is stored in register 16.

The output 17 from register 16 is used to address the tangent storage ROM 18, which outputs successively tangent values of α (0.00, 0.18, 0.38, and 0.64) at output 19. These tangent values are successively summed/subtracted by adder/subtracter 20. When adder/-subtracter 20 overflows, upon the number contained therein reaching unity, a carry output 29 is generated by adder/subtracter 20. When adder/subtracter 20 overflows and produces the carry output on line 29, the carry pulse is ANDed with the major axis clock 24 in AND gate 30 to generate the minor axis clock 31. When adder/ subtracter 14 overflows upon reaching the number 256, the carry output 27 applied to the J and K inputs of flip-flop 26 causes the flip-flop 26 to toggle and the Q output thereof (applied as the add-/subtract mode control line to each of the adders and subtracters 14 and 20) switches and adder/subtracters to subtract mode, whereupon numbers therein are successively diminished in accordance with the binary numbers applied thereto at the major axis clock rate. Overflow of adder/subtracter 14 occurs upon each 45°-octant of the selected circle having been generated, and it is seen that the adder/subtracters function as adders for octants I, II, V, and VII of the circle and as subtracters for octants II, IV, VI and VIII of the circle, corresponding (referring to FIG. 2) to the definition of the manner in which the angle α is defined in the various octants.

Referring again to FIG. 4, the binary number P/p, as loaded into the P/p register 11, is defined by the ratio of the largest number P that can be loaded (defined by the number of bits in the computation hardware) and the desired number p of major axis clock pulses to get to the 45° point of the circle drawing. FIG. 4 examples P/p=256/4=64 and four values of α are depicted in FIG. 4 the major axis projections of which are equally incremented. Tangent values outputted from tangent storage ROM 18 during the drawing of the first circle octant are cumulatively added in adder/subtracter 20. Upon the sum in adder/subtracter 20 reaching or exceeding unity, adder/subtracter 20 overflows, to gate major axis clocks on line 24 onto the minor axis clock line 31. Adder/subtracter 14, in adding the P/p number of 64 in a running total, puts out a carry on line 27 when the number therein reaches or exceeds 256, which causes J-K flip-flop 26 to toggle and produce a Q output which switches both adder/ subtracters to the subtract mode, whereupon these adder/subtracters count back down from the maximum number contained therein at the time of the carry output from adder/subtractor 14.

Figure 5:
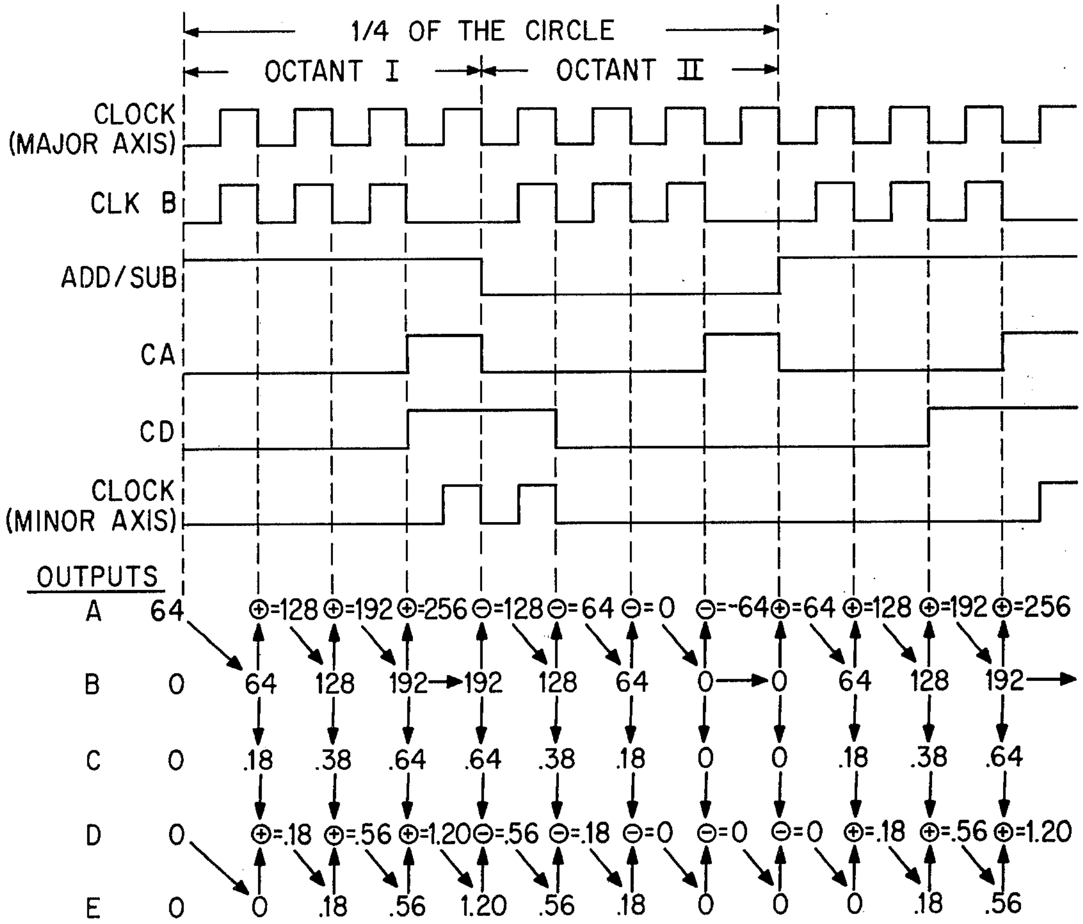
FIG. 5 depicts operational waveforms and data related to drawing the circle of FIG. 4.

Reference is made to the waveforms of FIG. 5, which illustrate operational waveforms for the exampled circle mode with eight-bit hardware and choice of four major-axis clock pulses per octant. With the number P/p=64 loaded into the P/p register, adder/subtracter 14 successively, from the instant of an initial load and clear pulse on line 12, adds binary 64 to a running total which was started at zero, and this running total is stored in register 16. The output 17 from register 16 addresses the tangent storage ROM 18 which, for this example, outputs successive tangent values of 0.00, 0.18, 0.38, and 0.64 at output 19. These tangent values are successively summed by adder/subtracter 20, which, prior to a carry output from adder/subtracter 14, functions as an adder. When adder/subtracter 20 overflows on 1, a carry pulse 29 is outputted therefrom. This carry output 29 is ANDed with the major clock pulse train to develop the minor axis clock on line 31. When adder/subtracter 14 overflows on a summation of 256 therein, the add/subtract flop-flop 26 toggles, adder/subtracters 14 and 20 are switched to the subtract mode, and one octant of the circle has then been generated. The waveforms of FIG. 5 depict by means of arithmetic numbers, those numbers sequentially appearing in adder/subtracter 14 and register 16, those outputted from tangent storage ROM 18, those outputted from adder/subtracter 20 and those outputted from register 22.

An additional operational feature should be pointed out concerning the operational waveforms of FIG. 5 and the clock timing. The overflow of adder/subtracter 14 on line 27 disables the clock to register 16 for that cycle. This is done so that the number loaded into register 16 is never larger than 255. If it were loaded, an incorrect tangent output would occur. The disabling of the clock input to register 16 for that cycle is accomplished by ANDing the major axis clock input 24 with the inverted carry output 27 from adder/subracter 14 by means of inverting 60 and AND gate 62.

With reference to FIG. 3, the carry output 27 from adder/subtracter 14 is seen to be applied through an inverter 60 with the output 61 from the inverter 60 being applied as a first input to AND gate 62. The major axis clock line 24, in circle mode as effected by function switch 63 is applied via mode switch 63, in circle mode, as the second input to AND gate 62. The output 64 from AND gate 62 is applied through OR gate 65 as the clock input 66 to register 16.

CLOCK DECODE LOGIC

Referring again to the waveforms of FIG. 5 it is emphasized that the minor axis clock is developed from the major axis clock by inhibiting clock pulses from the major axis clock pulse train upon an overflow 29 occurring in adder/subtracter 20 when the number therein reaches unity.

The clock decode logic block 25 of FIG. 3 functions to route the respective major axis and minor axis clock trains to proper ones of the X and Y up/down counters 36 and 37, so as to cause these counters to count up or down in response to the clock inputs thereto as a function of which octant of the circle is being generated at any moment of time. The octant counter 28 receives the carry output 27 from adder/subtracter 14 as an input and, referring again to the waveforms of FIG. 5, since the carry output pulse appears at the conclusion of each successive octant of the circle drawing, the count contained within the octant counter 28 is indicative of the octant within wich the circle drawing is being effected at any point in time. Thus, upon the application of an initial load and clear pulse on line 12 to start the drawing of a circle, the octant counter counts sequentially from 000 through 111 to generate a code indicative of the octant within which the circle drawing lies.

Figure 6:
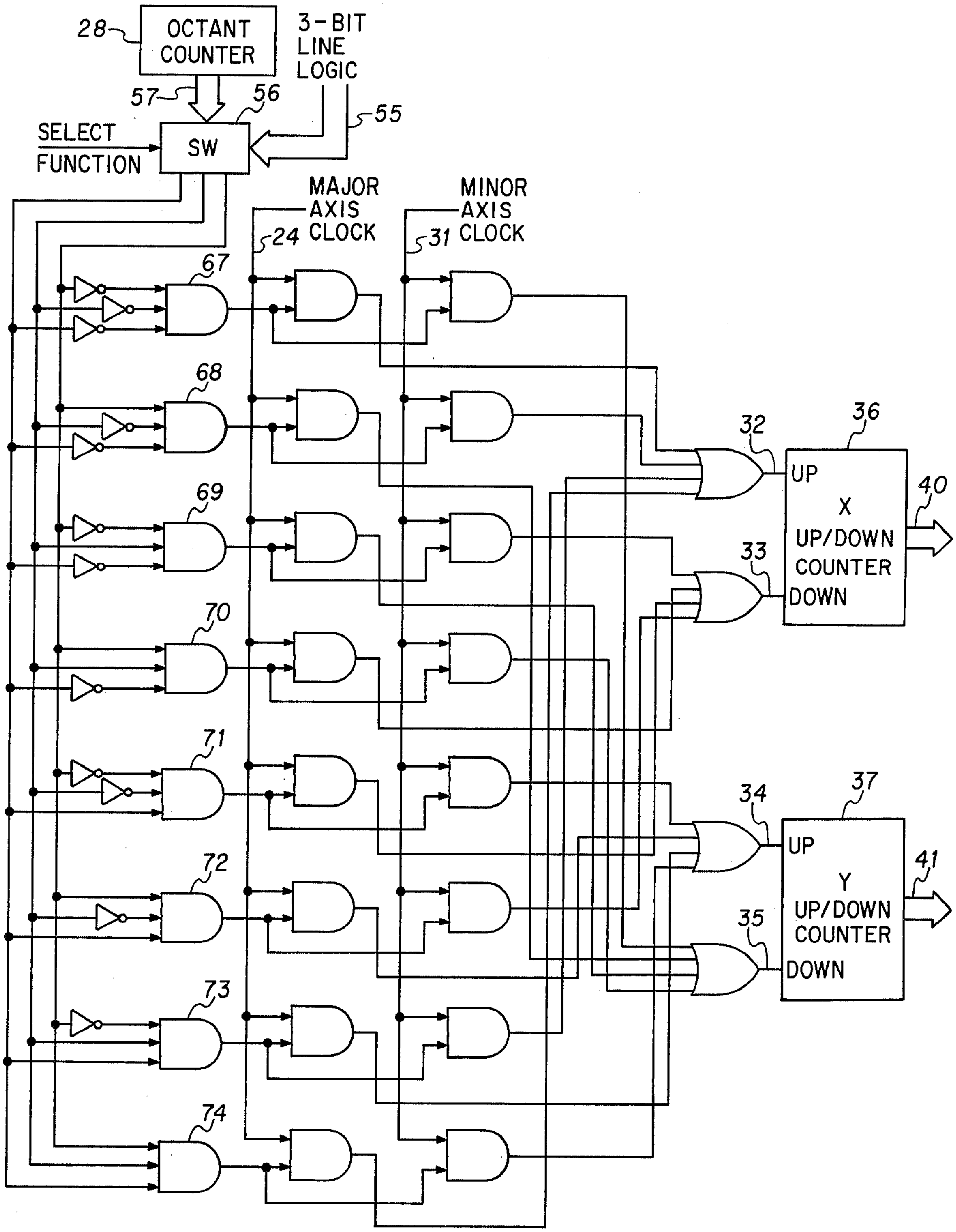
FIG. 6 is a schematic representation of logic circuitry as employed in the system of FIG. 3.

Reference is made to FIG. 6, which depicts an implementation of the clock decode logic block 25 of FIG. 3. In circle drawing mode, the circuitry responds to the output of the octant counter to route the major axis clock pulse train 24 and minor axis clock pulse train 31 to appropriate up and down terminals of the X and Y up/down counters 36 and 37 in accordance with the octant routing as outlined in Table 1. The logic circuitry might comprise, as depicted in FIG. 6 a first plurality of AND gates 67–74 to which the three-bit output generated by the octant counter 28 is applied either directly, or through appropriate inverters, such that the AND gates 67–74 sequentially output a binary 1 or successive octant counter outputs 000 through 111. The output from each of the AND gates 67–74 is supplied as a first input to an associated pair of AND gates, the other inputs of which respectively comprise the major axis clock train 24 and minor axis clock train 31. Routing of the major axis clock train 24 and minor axis clock train 31 to the appropriate one of the X and Y up/down counters 36 and 37, as defined in Table 1 above, may then be accomplished by OR'ing the outputs from predetermined ones of the AND gate pairs to the appropriate up or down terminal of one of the X and Y up/down counters 36 and 37. For example, during the first octant of circle drawing, the output from the octant counter, having been set to 000 by the initial load and clear pulse 12, provides a 000 output which is decoded by the uppermost depicted AND gate 67 to produce a binary 1 output which AND's the major axis clock 24 to the up terminal of the X up/down counter 36 and AND's the minor axis clock 31 to the down terminal of the Y up/down counter 37, thus effecting the routing depicted in Table 1 for octant I circle drawing. As the octant counter 28 sequentially counts upwardly in response to successive ones of the carry outputs 27 from adder/subtracter 14, successive ones of the remaining AND gate 68–74 of FIG. 6, together with their associated AND gate pair, route the major and minor axis clocks to the appropriate up and down terminal of one of the X and Y up/down counters 36 and 37, such that the clock train routing for the circle mode is effected, octant by octant, as outlined in Table 1.

CIRCLE DRAWING-GRAPHIC EXAMPLE

Figure 7:
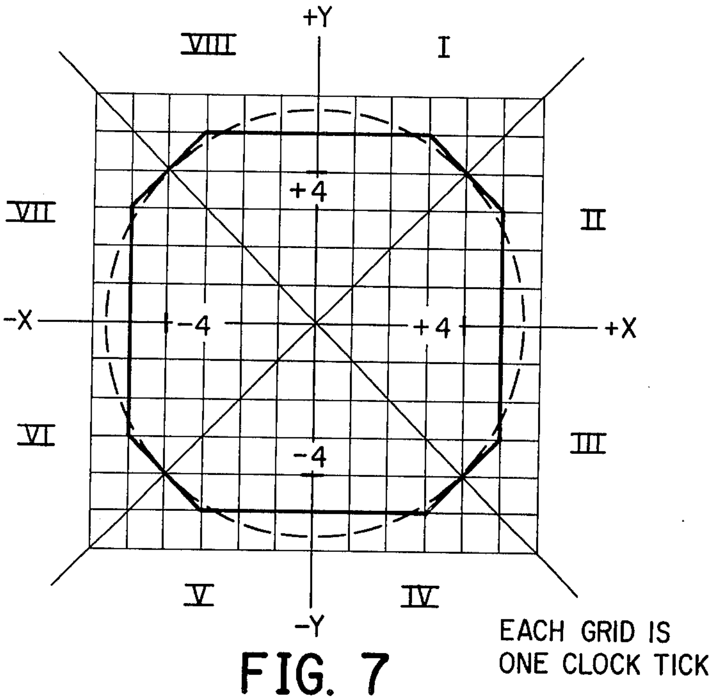
FIG. 7 is a graphic illustration of the circle approximation effected by the example of FIGs. 4 and 5.

FIG. 7 depicts graphically the drawing of the above exampled circle wherein the P/p number loaded into register 11 was selected as the number 256/4=64, thus defining four major axis clock pulses as the maximum number of clock bits in any one octant of the circle drawing. Referring to FIG. 7, the circle drawing starts at the beginning of octant I with three successive plus X counts and no Y counts since, referring to the waveforms of FIG. 5, three major axis clocks are generated before major clocks are gated onto the minor axis clock line. The beam is thus caused to be positioned in accordance with three clock pulses to the right. The fourth major axis clock pulse depicted in FIG. 5, as well as the fifth major axis clock pulse, are gated onto the minor axis clock pulse line, such that during the time occurrence of the fourth and fifth clock pulses, the X counter is incremented upwardly by 2 while the Y counter is simultaneously incremented downwardly by 2, resulting in a 45° slope tracing. The three remaining clock pulses occurring in octant II are illustrated as downward Y clocks in the absence of X clocks. In this manner, the tracing continues through successive octants as depicted graphically in FIG. 7. Each grid of FIG. 7 represents one clock pulse (one counter increment) and it can be seen that the approximation of the circle is never off by more than one bit.

It is to be understood that the accuracy for a given application would be increased by increasing the number of bits.

In the real world of cathode ray tube applications, the example circle of FIG. 7 would be extremely small (about 0.04 inch radius). For larger circles, the approximation becomes better, and it is to be realized that cathode ray tube deflection yokes, being inductive in nature, have a rounding effect on the sharp corners. To the observer's eye, the image drawn is indistinguishable from a perfect circle and the drawn image more perfectly approaches the true circle as the selected radius of the circle is increased.

LINE DRAWING MODE-GENERAL OPERATION

To draw a line, the P/p register 11 of FIG. 3 is loaded with a number related to the desired line slope, the X and Y up/down counters 36 and 39 are initialized with a line start point defining count, and, as will be further described, adder/subtracter 14 is disabled so that it addresses the tangent storage ROM 18 with a constant (corresponding to the address of the desired line slope) throughout the drawing of the line. In this way, the slope of the desired line is inputted to clocked adder/subtracter 20 on line 19 continuously at the major axis clock defined rate, and to accomplish the multiplication of $\Delta X$ and tangent $\alpha$, the addition is clocked by the major clock in adder/subtracter 20 operating continuously in the addition mode. If the slope of the line is tangent $\alpha$, then after a quantity of N clock pulses, we may write:

$$\text{Number in adder/subtracter } \mathbf{20} = N \tan \alpha \quad (18)$$

Since $\Delta X$ equals base clock, after N base clock pulses we may write:

$$X = \Sigma\Delta X = N, \quad (19)$$

and the number in adder/subtracter 20 may be expressed as $$\text{Number in adder/subtracter } 20 = N \tan \alpha = X \tan \alpha \quad (20)$$

Letting Y equal the output from adder/subtracter 20, Y may be expressed as:

$$Y = X \tan \alpha. \quad (21)$$

Expression (21) defines the equation of a line with slope of tangent $\alpha$.

If we now express $\Delta Y$ as:

$$\Delta Y = \text{Count change in adder/subtracter } \mathbf{20}, \quad (22)$$

then $\Delta Y$ may be expressed as:

$$\Delta Y = \Delta X \tan \alpha. \quad (23)$$

It follows that using the overflow from clocked adder/subtracter 20, operating in the add mode, as the $\Delta Y$ clock, (an overflow occurs each time the sum is equal to or greater than unity), the Y counter 37 will contain the value of Y beam movement which corresponds to the equation Y=X tangent $\alpha$. Similarly, summing $\Delta X$ clock in the X position cunter 36 produces the corresponding value of X beam movement. The concept of line drawing is, generally, to set in a tangent value defined by the line slope. The slope of the line defines the line as being in one of eight octants. The tangent value of the angle between 0° and 45° within that octant, is then addressed in the tangent storage ROM. The projection of the line on the X and Y axis defines a major axis projection for that line, and this establishes whether the major axis clock is inputted to the X or the Y up/down counter. The minor axis projection establishes that fewer clocks be inputted to the corresponding counter, and is again defined by the product of the major axis clock and the tangent of the line slope defining angle. The length of the line is determined by selection of the number of major axis clock pulses applied during the line drawing.

Referring to FIG. 3, the computation circuitry must cause the tangent storage ROM 18 to be continuously addressed to output a constant tangent value corresponding to the slope of the line to be drawn. For this purpose adder/subtracter 14 is caused to function, upon initialization, only as an adder, under control of the Q output from flip-flop 25. The initialization pulse on line 12 sets flip-flop 26 such as the Q-output therefrom that is high. This high-level Q output is applied to adder/subtracter 14 to place the adder/subtracter in an add mode. "Disabling" of adder/subtracter 14 is accomplished by allowing one and only one clock pulse, subsequent to initialization, to be applied to register 16, to enter therein the selected tangent value of the line to be drawn as loaded into P/p register 11. Thereafter, since no further clock pulses are applied to register 16, the output 17 from register 16 is a constant address corresponding to the tangent value in tangent storage ROM 18 defined by the slope of the line to be drawn. Thus, the operation in line mode is described as including a "disablement" of adder/subtracter 14, since the device is controlled functionally to serve only as a means of loading the desired tangent address in register 16, and thereafter serves no further function. Further, there is no carry output on line 27 from adder/subtracter 14, since the number contained therein remains at that unchanging number supplied by the P/p register 11. With no carry output on line 27 from adder/subtracter 14, the flip-flop 26 remains in the initialized state, thus perpetuating the add function of adder/subtracter 20. The single clock input to register 16 upon the initialization of a line drawing mode is implemented in FIG. 3 by means of a mode function switch 63 applying the major axis clock 24 to a flip-flop 75 to which the initial load and clear line 12 is applied as a setting input. Flip-flop 75 responds to the first clock pulse transition applied thereto to change states, and thereafter remains in this set condition, such that only one clock transition is applied from the output of flip-flop 75 through OR gate 65 to the clock line 66 applied to register 16. It might be emphasized here, that the above described disablement of adder/subtracter 18 and the unitary clock input to register 16, is necessary in line drawing mode so that the tangent storage ROM is addressed continuously with a single selected address. For the purpose of the theory of line drawing, the input registers preceding the tangent storage ROM essentially would not be needed, and the tangent storage ROM might merely be addressed directly by a selected binary address corresponding to the tangent value defined by the slope of the line to be drawn.

Adder/subtracter 20, in response to a continuous input of the tangent value defined by the slope of the line to be drawn from the tangent storage ROM, provides the successive summation computation to accomplish the development of a carry output on line 29 when the number therein reaches or exceeds unity, and selected ones of the major axis clock pulses are gated to the clock decode logic as the minor clock.

If one then assigned a three-bit line octant logic for line drawing mode, as depicted in Table 1 and this three-bit line drawing logic inputted to the clock decode logic block 25 in lieu of the octant counter three-bit code supplied during circle mode operation, the same clock logic circuitry of FIG. 6 will provide proper routing of the major axis clock and minor axis clock to the appropriate up or down terminals of the X and Y up/down counters 36 and 37.

LINE DRAWING MODE, GRAPHIC EXAMPLE

Figure 8:
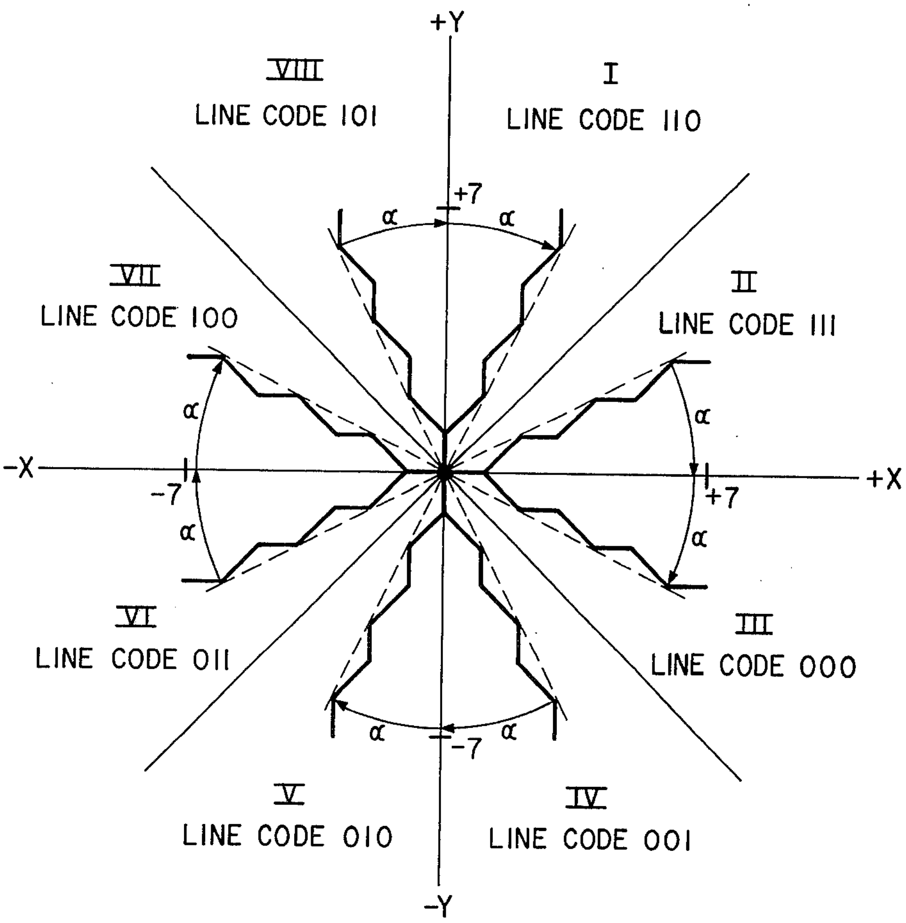
FIG. 8 graphically represents cathode ray tube beam deflection sequences to trace each of a plurality of lines having predetermined and related slopes.

FIG. 8 depicts an example of line drawing of a plurality of lines lying respectively near midpoints of each of the octants I–VIII. In FIG. 8, each grid is defined as one clock tick in length and all lines are depicted as being seven clocks in length, in which case a binary number 7 would be loaded into the line length counter 49, such that seven clock pulses after initialization would define the length of the line.

For any of the lines depicted in FIG. 8, the angle $\alpha$ is defined as arc tan 0.5 (approximately 26½°), and the tangent storage ROM 18 in FIG. 3 would be continuously addressed to read out a 0.5 tangent value for application to adder/subtracter 20. A carry output 29 is accordingly developed in adder/subtracter 20 on alternate ones of the major axis clock pulses applied to resister 22 and thus alternate ones of the major axis clock would be gated through AND gate 30 onto the minor axis clock line 31. Using the assigned three-bit code logic for each octant as above depicted in Table 1, the clock decode logic block 25, as implemented in FIG 6. would then route the major and minor axis clocks to the appropriate X and Y counters to cause the line to be drawn as a series of steps defined by either horizontal-only X deflections (plus or minus) or vertical-only Y deflections (plus or minus), with intervening 45° sloped segments wherein both the X and Y counters are simultaneously clocked. After seven clock periods, the drawing of the line is completed, since the down counter 49 of FIG. 3 will have counted down to zero. The associated zero count detector 51 provides a mode terminating logic input to the initial load and clear line 12. As in the case of the exampled circle drawing, the graphically depicted line drawing of FIG. 8 shows exaggerated steps and, to the observer's eye, the selected line is drawn at the selected slope and appears as a straight line. As in the case of circle drawing, the line start point may be selectively inputted as a count initialization of the X and Y counters. It should be emphasized that the line slope data entered into P/p register 11 corresponds to an address within tangent storage ROM 18 which is defined by the tangent of the angle $\alpha$ and this angle $\alpha$ is measured from the line to the axis upon which its major projection lies. The axis upon which the major projection of the line lies in turn defines that the major axis clock be applied to that one of the X and Y counters.

The present invention is thus seen to provide a digital means for drawing line and circle graphics on a cathode ray tube by developing in respective X and Y digital counters a count which ultimately defines the X and Y deflection of the cathode ray tube beam. The system permits circles of selected radius to be drawn, the more bits employed in the hardware the larger the circle radius capability. The system permits lines to be drawn of a desired slope and of desired length. Each operational mode uniquely minimizes data storage requirement by requiring but a single table of tangent values of angles between 0° and 45°.

Although this invention has been described with respect to a particular embodiment thereof, it is not to be limited, as changes might be made therein which fall within the scope of the invention as defined in the appended claims.

What is claimed is:

1. A digital system for developing in respective digital up/down counters, counts indicative respectively of X and Y deflection signals for a cathode ray tube beam to cause the beam to successively deflect to points on a line of predetermined slope comprising, a source of clock pulses, a first binary adder means for developing a cumulative total of successive inputs thereto and having a carry output exhibiting a predetermined discrete logic level when the binary number in said first binary adder is equal to or greater than unity; means for repeatedly inputting a binary number at said clock rate to said first binary adder means, comprising a binary memory in which are stored addressable successive tangent values of predetermined angles between 0° and 45°, each predetermined angle being defined as an angle between the vertical radii and the radii through a point which has an X coordinate equal to $N(\Delta X)$ or as an angle between the horizontal radii and the radii through a point which has a Y coordinate equal to $N(\Delta Y)$, where $\Delta X$ and $\Delta Y$ are equal constants and where N varies between zero and a predetermined maximum number of angles, and memory addressing means for repeatedly addressing said binary memory at said clock rate to read out an addressed one of said tangent values; coincidence gating means responsive to said clock pulses and the carry output of said first binary adder means to pass those of said clock pulses time coincident with the occurrence of said predetermined logic level of said first binary adder means carry output to a second clock line; and a logic means receiving said clock pulses and those of said clock pulses on said second clock line and a predetermined code word definitive of that one of eight contiguous octants of 360° within which said line lies to route said clock pulses and those of said clock pulses on said second clock line to respective individual ones of the up and down count input terminals of said X and Y counters.

2. The system of claim 1, further comprising a down-counter, means for presetting said down-counter, prior to initialization of a line drawing sequence, to a selected binary count, means applying said clock pulses to the input of said down-counter upon initialization of a line drawing sequence, and further logic means responsive to a zero count in said down-counter to inhibit further routing of said clock pulses and those of said clock pulses, on said second clock line, whereby the length of said line is defined by the number of clock pulse increments applied to one of said X and Y up/down counters.

3. The system of claim 1 wherein said first binary adder means comprises mode control means for selectively converting the operational mode thereof to one of successive subtraction of inputs thereto from the cumulative total therein; said means for repeatedly addressing said binary memory comprising a further binary adder means with selective subtractive mode capability like that of said first adder, said further binary adder means having a carry output exhibiting said predetermined discrete binary level when the number therein exceeds the bit defined capacity thereof, means for inputting to said further binary adder means a predetermined binary number between zero and that number corresponding to the bit defined capacity thereof, mode switching logic means responsive to said predetermined discrete logic level on the carry output of said further binary adder means to switch each of said binary adder means from the adding mode thereof to the subtractive mode thereof for the duration of said predetermined discrete logic level carry output from said further binary adder means, means for initializing said mode switching logic means to output that logic level definitive of adding mode operation of each of said binary adding means, and said logic means receiving said clock pulses and those of said clock pulses on said second clock line, and in response to inputted logic words respectively definitive of successive contiguous ones of said octants, to route said clock pulses and those of said clock pulses on said second clock line to respective individual ones of the up and down count inputs of said X and Y counters.

4. The system of claim 3, wherein said logic words definitive of respective successive contiguous ones of said octants comprise the respective successive outputs of a three-bit counter to which the carry output of said further binary adder means is connected as input.

5. The system of claim 4, further comprising a zero count detecting means receiving the output of said three-bit counter, and further logic means responsive to a zero count in said zero count detector to inhibit further routing of said clock pulses and those of said clock pulses on said second clock line to said X and Y counters.

6. The system of claim 3 comprising means to selectively disable said further binary adder means upon a binary number having been first inputted thereto, whereby said binary number contained therein is repeatedly outputted to said binary memory means to address a predetermined one of the tangent values stored therein for input to said first binary adder means.

* * * * *

UNITED STATES PATENT AND TRADEMARK OFFICE

CERTIFICATE OF CORRECTION

PATENT NO. : 4,023,027

DATED : May 10, 1977

INVENTOR(S) : Lyle R. Strathman, Robert A. Bolin, Vincent B. Collins and Ronald L. Swanson It is certified that error appears in the above-identified patent and that said Letters Patent are hereby corrected as shown below:

Column 1, line 12, delete "System" and substitute --system--;
line 19, delete the word "system" and substitute therefor --systems--;
line 52, after the word "incremented" add the word --angles--.

Column 3, line 19, delete expression (3) and substitute therefor the the following:

$$--\Delta Y_1+\cdots\cdots+\Delta Y_N=\Delta X_1 \tan \alpha_1+\cdots\cdots+\Delta X_n \tan \alpha_N \quad (3)--.$$

Column 4, line 10, delete expression (8) and substitute therefor the following:

$$--\Delta Y= -\Delta X \tan \alpha', \text{ where } \tan \alpha \text{ varies as } X. \quad (8)--;$$

line 19, delete "$\alpha$Y" and substitute therefor --$\Delta$Y--;
line 29, delete expression (11) and substitute therefor the following:

$$--\Delta Y_1+\cdots\cdots+\Delta Y_N=\Delta X_1 \tan \alpha_1+\cdots\cdots+\Delta X_N \tan \alpha_N \quad (11)--;$$

line 31, delete "constrast" and substitute therefor --constant--;
line 55, delete "projectin" and substitute therefor --projection--;

UNITED STATES PATENT AND TRADEMARK OFFICE

CERTIFICATE OF CORRECTION

PATENT NO. : 4,023,027

DATED : May 10, 1977

INVENTOR(S) : Lyle R. Strathman, Robert A. Bolin, Vincent B. Collins and Ronald L. Swanson It is certified that error appears in the above-identified patent and that said Letters Patent are hereby corrected as shown below:

line 57, delete "$\alpha$=$\lambda$" and substitute therefor --$\alpha$=--.
Column 5, line 1, after "0°" insert the following --; in octant VII, from 0° to 45°; and in octant VIII, from 45° to 0°.--;
line 63, after "axis" insert --clock--;
line 67, delete "further" and substitute --Further--.
Column 7, line 5, delete "0´" and substitute --0°--;
Column 8, line 18, delete "O'd" and substitute --OR'd--;
line 55, delete "suply" and substitute --supply--.
Column 10, line 33, after "octants I," delete "II" and substitute therefor --III--.
Column 11, line 62, delete "wich" and substitute therefor --which--.
Column 12, line 14, delete "or" and substitute therefor --for--.
Column 13, line 67, delete "cunter" and substitute therefor --counter--.

Column 16, line 61, delete the comma after the word "pulses".

Signed and Sealed this

*thirtieth* Day of *August 1977*

[SEAL]

*Attest:*

RUTH C. MASON
*Attesting Officer*

C. MARSHALL DANN
*Commissioner of Patents and Trademarks*